United States Patent [19]

Broughton, Jr. et al.

[11] 4,230,818

[45] Oct. 28, 1980

[54] REDUCTION OF GLYCOL ETHERS IN POLYESTERS

[75] Inventors: Roy M. Broughton, Jr., Auburn, Ala.; Douglas D. Callander, Akron; Brian W. Pengilly, Akron; Joseph P. Schirmer, Akron; Terence E. Winters, Gates Mills, all of Ohio

[73] Assignee: The Goodyear Tire & Rubber Company, Akron, Ohio

[21] Appl. No.: 16,673

[22] Filed: Mar. 1, 1979

[51] Int. Cl.$^3$ ............................................. C08G 63/18
[52] U.S. Cl. ................................. 528/272; 528/302; 528/309; 528/495; 528/496; 528/501
[58] Field of Search ............... 528/272, 495, 496, 501, 528/309, 302

[56] References Cited

U.S. PATENT DOCUMENTS

| 4,077,945 | 3/1978 | Heinze et al. ................ 528/309 |
| 4,128,535 | 12/1978 | Baker ................................ 528/272 |
| 4,146,729 | 3/1979 | Goodley et al. ............. 528/309 X |

*Primary Examiner*—Lucille M. Phynes
*Attorney, Agent, or Firm*—Oldham, Oldham

[57] ABSTRACT

A process for reducing the glycol ether content in polyesters involves adding a glycol to a polyester oligomer solution prior to polymerization, distilling the oligomer solution to remove vapor containing the glycol as well as the glycol ether, and polymerizing the solution to produce a polyester containing a reduced glycol ether content.

11 Claims, No Drawings

REDUCTION OF GLYCOL ETHERS IN POLYESTERS

BACKGROUND OF THE INVENTION

The present invention relates to reducing the glycol ether content in polyesters. More specifically, the invention relates to reducing the amount of diethylene glycol in the production of polyethyleneterephthalate.

Heretofore, polyesters have been prepared by the reaction of carboxylic acids or esters thereof with glycols. As well known to those skilled in the art, a glycol ether is inherently contained in the polyester. Ether links are light sensitive and thus degrade in the presence of light. Moreover, in the presence of heat, thermal degradation occurs. This results in a polyester having reduced stability such that the molecular weight is affected by light or heat and reduces various physical properties such as tensile strength, flex strength, and the like.

SUMMARY OF THE INVENTION

It is therefore an object of the present invention to reduce the glycol ether content of a polyester.

It is another object of the present invention to provide a polyester having a reduced glycol ether content, as above, having improved light and thermal stability, as well as molecular weight retention.

It is still another object of the present invention to provide a polyester having a reduced glycol ether content, as above, wherein, through the addition of glycol to a polyester oligomer solution and distillation thereof, and glycol along with the glycol ether is removed and results in a polymer having a lower glycol ether content.

It is yet another object of the present invention to provide a polyester such as polyethyleneterephthalate having a reduced glycol ether content, specifically diethylene glycol, where, through the addition of ethylene glycol to a polyester oligomer solution and distillation thereof, said ethylene glycol along with diethylene glycol ether is removed with the result being a polyester having a low diethylene glycol content.

These and other objects of the present invention will be more apparent by reference to the preferred embodiments of the invention.

In general, a process for reducing the glycol ether level in a polyester, comprises the steps of: adding a glycol containing from 2 to about 12 carbon atoms to a vessel containing a polyester oligomer solution; heating said oligomer solution to a temperature of from about 20° C. below to about 100° C. above the boiling point of said glycol; generating a vapor; and distilling said vapors so that said glycol ether contained in said vapor is removed from said oligomer solution.

PREFERRED EMBODIMENTS OF THE INVENTION

In the typical or conventional preparation of polyesters, dicarboxylic acids or esters thereof are reacted with polyols such as glycols to produce the polymer. Inherent in the manufacture of polyesters is the production of glycol ethers which often are chemically bound to the polyester chain. Since small amounts of glycol ether are harmful to light and thermal stability of the polyester chain and can drastically affect physical properties, it is highly desirable to reduce the amount of concentration of the ether in the polymer chain. According to the concepts of the present invention, the amount of glycol and glycol ether is reduced by, adding a glycol to a reacted oligomer solution, heating the polyester oligomer solution and removing the generated vapor phase.

In the manufacture of a polyester, a carboxylic acid is reacted with a polyol. Generally, such polyesters include polymers formed from dicarboxylic acids containing a total of from 2 to 16 carbon atoms reacted with polyhydric alcohols, such as a glycol, containing from 2 to 12 carbon atoms. The dicarboxylic acids may be an alkylene containing a total of from 2 to 16 carbon atoms. Preferably, the acids are aryl or an alkyl substituted aryl containing from 8 to about 16 carbon atoms. Specific examples of linear or alkyl dicarboxylic acids include oxalic acid, malonic acid, succinic acid, glutaric acid, adipic acid, pimelic acid, suberic acid, azelaic acid, sebacic acid, and the like. Specific examples of an aryl acid include the various isomers of phthalic acid, such as para-phthalic acid (terephthalic acid) and naphthalic acid. Specific examples of alkyl substituted aryl acids include the various isomers of dimethylphthalic acid such as dimethylisophthalic acid, dimethylorthophthalic acid, dimethylterephthalic acid, the various isomers of diethylphthalic acid such as diethylisophthalic acid, diethylorthophthalic acid, diethylterephthalic acid, the various isomers of dimethylnaphthalic acid such as 2,6-dimethylnaphthalic acid and 2,5-dimethylnaphthalic acid, and the various isomers of diethylnaphthalic acid. Generally, terephthalic acid is highly preferred.

In lieu of carboxylic acids, esters of carboxylic acids can be utilized. Thus, alkyl esters containing a total of from 4 to about 20 carbon atoms as well as alkyl substituted aryl esters containing from about 10 to about 20 carbon atoms may be utilized. Examples of specific alkyl diesters include dimethyl azelate, diethyl azelate, and the like. Specific examples of various alkyl substituted aryl diesters include the various isomers of dimethylphthalate, the various isomers of diethylphthalate, the various isomers of dimethylnaphthalate, and the various isomers of diethylnaphthalate. The various esters of dimethylphthlate are preferred.

The glycols may be straight-chained or branched. Specific examples include ethylene glycol, propylene glycol, trimethylene glycol, 1,2-butane diol, 1,3-butane diol, 1,4-butane diol, 2,3-butane diol, neopentyl glycol, and the like. Of the various glycols, those having from 2 to 8 carbon atoms are preferred, with ethylene glycol and 1,4-butane diol being highly preferred.

Generally, the equivalent ratio of the glycol to the carboxylic acid or esters thereof ranges from about 0.5 to about 2.5, desirably 1.0 to about 1.4 and preferably from about 1.0 to about 1.1. According to the present invention, these components are allowed to react for a portion of time, thereby producing oligomers with a fraction thereof, typically from ¼ to ¾ being withdrawn and further reacted to make a conventional or usable polyester. The remaining portion, commonly referred to in the art as a "heel," is utilized as a solvent for fresh carboxylic acid. That is, to the "heel" is added a desired amount of fresh, virgin, or unreacted carboxylic acid and glycol. This solution is heated and allowed to react for a period of time to permit esterification and the production of oligomers and, once again, a fraction thereof is withdrawn and made into a polyester. A more in depth description of this process is set forth in U.S.

Pat. No. 4,020,049 to Rinehart, which is hereby fully incorporated by reference.

The present invention resides in taking the oligomer solution, either in the vessel or transferring it to a different vessel, and conducting a series of steps to remove the glycol ether which, when using the highly preferred starting compounds of terephthalic acid and ethylene glycol, is diethylene glycol (DEG). More specifically, the container atmosphere above the oligomer solution is removed by purging with an inert gas such as nitrogen, helium, argon or carbon dioxide. Then, utilizing the inert gas, the container is pressurized from atmospheric, up to about 100 psi. Generally as is apparent from the examples, the pressure is atmospheric although, the pressure may range from about 25 psi to about 80 psi and preferably from about 30 psi to about 75 psi. The vessel is then heated to a temperature of generally near and preferably above the boiling point of the particular glycol. Thus, in the preferred embodiment of the invention wherein polyethyleneterephthalate is produced, the glycol is ethylene glycol. Ethylene glycol has a boiling point of about 200° C. at atmospheric pressure and, thus, a desirable heating temperature is from about 180° C. to a maximum of about 290° C. Of course, the temperature will vary depending upon the pressure and, desirably, the temperature ranges from about 200° C. to about 285° C. A preferred temperature range is from about 225° C. to about 280° C. Generally, the temperature of the vessel for any specific glycol generally ranges from about 20° C. below the boiling point to about 100° C. above the boiling point and, desirably, from about the boiling point to about 90° C. above it. Preferably the temperature of the vessel is from about 20° C. above to about 80° C. above the boiling point. Virgin or fresh glycol is then added either in bulk or preferably in a slow manner over a period of time, as drop-wise to the reacted oligomer solution. The amount of glycol added to the pressurized oligomer solution generally ranges from about 0.3 to about 2.0 times the weight of the oligomer solution and, preferably, from about 0.7 to about 1.3.

The pressurized vessel contains a distillation column wherein the vapor from the oligomer solution is collected and condensed. The ether in the oligomer solution can exist in three interconvertible states: ether bound in the polymer chain ⇌ ether in the liquid phase ⇌ ether in the vapor phase (along with the glycol and perhaps some water). The distillation naturally removes the vapors from the system without fractionation (which tends to retain the ether, e.g., diethylene glycol) and, thus, reduces the final level of ether, for example, diethylene glycol, in the polymer below what it would have otherwise been. The amount of distillation time will naturally vary with temperature, amount of glycol added, and pressure. Normally, periods of from about 20 minutes to about 4 hours and, generally, from about 50 minutes to about 2 hours. As previously noted, the best effects are generally obtained by addition of the glycol in a drop-wise manner, usually throughout the entire distillation period.

The polyesters produced according to the method of the present invention may be used for any conventional uses such as fabrics and cord as, for example, respectively, in conveyor belts or tires. Since the ether level such as diethylene glycol affects thermal stability as well as physical properties, the polyesters of the present invention yield a more desirable product as for use in tire cord, with heat buildup is often encountered during usage.

The present invention will be better understood by reference to the following examples.

EXAMPLE I

A terephthalic acid oligomer solution (200 grams of 1.2/1.0 ethylene glycol/terephthalic acid) was melted in a 500 milliliter three-neck flask equipped with a nitrogen inlet, dropping funnel, stirrer, and distilling head. The flask was heated to a temperature of about 270° C. and 200 milliliters of ethylene glycol was added via the dropping funnel over a one-hour period, with the vapors which were distilled being condensed. The pressure was atmospheric. The distillate contained 0.19 weight percent diethylene glycol compared to 0.08 weight percent contained in the added ethylene glycol. Moreover, the DEG content of the oligomer solution remained substantially unchanged, that is, 1.69 DEG initially and 1.70 after the one-hour reaction period.

EXAMPLE II

In a similar manner, 75 grams of terephthalic acid oligomer solution was charged into a tube reactor and heated to a temperature of 275°–280° C. at atmospheric pressure in the presence of nitrogen. One hundred milliliters of ethylene glycol was added in a drop-wise manner to the molten heel during the course of time of about 45 minutes. The distillate was collected and, along with the reacted heel, analyzed for DEG content. The following results were obtained.

| COMPONENT | WEIGHT PERCENT OF DEG |
|---|---|
| Oligomer solution (initial) | 1.69 |
| Oligomer solution reacted | 1.66 |
| Ethylene glycol added | 0.08 |
| Ethylene glycol distilled | 0.26 |

The oligomer solution was further distilled for an additional period of 15 minutes. The final distillate obtained contained 0.33 percent diethylene glycol. The oligomer was then reacted in a conventional manner to produce a polyester which contained 1.71 percent diethylene glycol by weight.

As readily apparent from this example, the amount of diethylene glycol was reduced since normally such a polymer would contain approximately 1.8 to 1.9 percent DEG. Moreover, during the course of reaction of the oligomer solution, the amount of DEG increases. Yet, in the present example, it had actually dropped.

EXAMPLE III

In a manner similar to Example I, 75 grams of an oligomer solution having 2.31 percent DEG was added to a three-neck flask, purged and pressurized with nitrogen at atmospheric pressure. During the course of one hour, 100 milliliters of virgin ethylene glycol initially containing 0.12 percent DEG was added. After 40 minutes, the condensate was tested and contained 0.19 percent DEG. At the end of the one-hour period, the condensate from the distillation collection column for the final 20-minute portion contained 0.17 percent DEG. The oligomer initially contained 2.31 percent DEG with the final polymer containing 2.14 percent. Thus, it is quite apparent that not only is DEG removed from the distillation column, but that the amount of DEG in the polymer is less than the amount contained in the initial oligomer solution.

While in accordance with the patent statutes, a detailed description of the preferred embodiment and best mode has been set forth, the invention is measured by the attached claims.

What is claimed is:

1. A process for reducing the glycol ether level in a polyester, comprising the steps of:
   reacting a dicarboxylic acid having from 8 to 16 carbon atoms selected from the group consisting of an aryl, and an alkyl substituted aryl compound with a glycol having from 2 to 12 carbon atoms to form a polyester oligomer solution, the equivalent ratio of said glycol to said dicarboxylic acid ranging from about 0.5 to about 2.5;
   subsequently adding after said reaction a vaporizable glycol containing from 2 to about 12 carbon atoms to said polyester oligomer solution;
   pressurizing with an inert gas said polyester oligomer solution containing said added vaporizable glycol to a pressure of from about atmospheric to about 100 psi;
   heating said oligomer solution to a temperature of from about 20° C. below to about 100° C. above the boiling point of said vaporizable glycol and generating vapors; and
   distilling said vapors so that said vaporizable glycol and said ether contained in said vapor is removed from said oligomer solution.

2. A process according to claim 1, including adding from about 0.2 to about 2.0 parts by weight of said vaporizable glycol based upon 1.0 part of said oligomer solution.

3. A process according to claim 2, wherein said vaporizable glycol contains from 2 to 8 carbon atoms, wherein said heating temperature ranges from the boiling point to about 90° C. above the boiling point of said vaporizable glycol,
   wherein said aryl dicarboxylic acid is selected from the group consisting of the various isomers of phthalic acid, the various isomers of naphthalic acid, and combinations thereof,
   wherein said alkyl substituted aryl dicarboxylic acids are selected from the group consisting of the various isomers of dimethylphthalic acid, the various isomers of diethylphthalic acid, the various isomers of dimethylnaphthalic acid, the various isomers of diethylnaphthalic acid, and combinations thereof,
   wherein the glycol which is reacted with said dicarboxylic acid to form said polyester oligomers has from 2 to 8 carbon atoms, and wherein the equivalent ratio of said glycol which is reacted with said dicarboxylic acid ranges from about 1.0 to about 1.5.

4. A process according to claim 3, wherein said inert gas is selected from the class consisting of nitrogen, helium, argon and carbon dioxide.

5. A process according to claim 3, wherein the amount of vaporizable glycol added ranges from about 0.7 to about 1.3 parts per part of oligomer solution, the pressure of said vessel is about atmospheric, and wherein said heated temperature ranges from about 20° C. above to about 80° C. above the boiling point of said vaporizable glycol.

6. A process according to claim 5, wherein said vaporizable glycol added is ethylene glycol.

7. A process according to claim 6, wherein said dicarboxylic acid is terephthalic acid and the equivalent ratio of said ethylene glycol reacted with said dicarboxylic acid ranges from about 1.0 to about 1.1.

8. A process according to claim 2, including the additional step of polymerizing said oligomer solution to form a polyester having a reduced amount of glycol ether.

9. A process according to claim 5, including the additional step of polymerizing said oligomer solution to form a polyester having a reduced amount of glycol ether.

10. A process according to claim 7, including the additional step of polymerizing said oligomer solution to form a polyester having a reduced amount of glycol ether.

11. A process according to claim 3, including the additional step of polymerizing said oligomer solution to form a polyester having a reduced amount of glycol ether.

* * * * *